US008290442B2

(12) United States Patent
Whatmough et al.

(10) Patent No.: US 8,290,442 B2
(45) Date of Patent: Oct. 16, 2012

(54) TESTING MEDIA CONTENT FOR WIRELESS COMMUNICATION DEVICES

(75) Inventors: Ken Whatmough, Georgetown (CA); John Hayman, Etobicoke (CA); David F. Tapuska, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 109 days.

(21) Appl. No.: 11/516,495

(22) Filed: Sep. 7, 2006

(65) Prior Publication Data

US 2008/0064340 A1    Mar. 13, 2008

(51) Int. Cl.
H04B 17/00    (2006.01)
(52) U.S. Cl. ............... 455/67.11; 455/550.1; 455/412.1; 455/412.2; 455/552.1; 709/246; 709/238
(58) Field of Classification Search ............... 455/67.11, 455/550.1, 412.1, 412.2, 435.2, 552.1; 709/238, 709/204–205, 218, 246
See application file for complete search history.

(56) References Cited

U.S. PATENT DOCUMENTS

| | | | |
|---|---|---|---|
| 5,911,582 | A | 6/1999 | Redford et al. |
| 7,647,613 | B2 | 1/2010 | Drakoulis et al. |
| 2002/0065927 | A1 | 5/2002 | Janik et al. |
| 2003/0061283 | A1* | 3/2003 | Dutta et al. ............... 709/204 |
| 2006/0064399 | A1* | 3/2006 | De Sio ............... 707/1 |
| 2006/0068818 | A1* | 3/2006 | Leitersdorf et al. ........... 455/466 |
| 2006/0230337 | A1 | 10/2006 | Lamont et al. |
| 2006/0276997 | A1 | 12/2006 | Drees |
| 2007/0136685 | A1 | 6/2007 | Bhatla et al. |
| 2007/0178843 | A1 | 8/2007 | Singh et al. |
| 2007/0288836 | A1 | 12/2007 | Partovi |
| 2009/0006651 | A1* | 1/2009 | Kim ............................. 709/246 |

FOREIGN PATENT DOCUMENTS

| | | |
|---|---|---|
| EP | 0847008 A2 | 6/1998 |
| EP | 1562321 A2 | 8/2005 |
| WO | 03036491 A1 | 5/2003 |

OTHER PUBLICATIONS

Craig J. Johston, Richard Evers, "Professional BlackBerry" Jul. 2005, ISBN: 978-0-7645-8953-9, Chapter 1, p. 8.*
Ikivo AB: "Mobile SVG: The Graphics Wave of the Future" (online) May 24, 2006, pp. 1-11, XP002417275, pp. 8-10.
Research in Motion Limited: "Blackberry Java Development Environment, Version 3.2, Developer Guide (Table of Contents Chapters 1, 2)" Developer Guide, Jan. 24, 2002, pp. 1-22.
Craig J. Johnston: "Professional BlackBerry" Wiley (Online) Jul. 2005, p. 0, XI-XVI, 3-18, XP002417374.

* cited by examiner

*Primary Examiner* — Nick Corsaro
*Assistant Examiner* — Babar Sarwar

(57) ABSTRACT

A communications network comprises a wireless communication device, a mobile data service and an apparatus for testing media content developed for a wireless communication device. This apparatus comprises a media content composer module, a web server, and a dispatcher module. The dispatcher module is programmed to: receive a media content simulation request from the composer module; publish media content developed on the composer module onto the web server, the published content having a uniform resource locator (URL) associated thereto; and transmit to the mobile data service the URL and instructions to the wireless communication device or a wireless communication device simulator to open a web browser and access the URL thereby downloading the media content from the web server.

12 Claims, 12 Drawing Sheets

TESTING MEDIA CONTENT FOR WIRELESS COMMUNICATION DEVICES

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyright rights whatsoever.

TECHNICAL FIELD

The following relates to the field of wireless communication devices, and more specifically, to testing media content developed for wireless communication devices.

BACKGROUND

Wireless communication devices, such as cellular phones, personal digital assistants and the like, have components that include microprocessors, input peripherals such as a keypad, special function buttons and wheels, output peripherals, and information storage means. These devices run one or more software applications such as micro-browsers, address books, and email clients. Additionally, current generations of such devices have access to a plurality of services via the Internet. A wireless device may, for example, be used to browse web sites on the Internet, to transmit, receive, and execute media content such as graphics and graphical animations, and to execute streaming audio and/or video applications.

During the development of media content for mobile devices, a content developer may want to test completed content, and/or make a change to the content using a content development tool and immediately test the changes on a wireless communication device or a simulator of such device. This edit-and-test cycle can occur repeatedly until the developer is satisfied with the result. Each time the content developer wants to test content, he or she must follow a lengthy series of manual steps, which can become distracting, time consuming and tedious. Known media content development tools include Macromedia/Adobe Flash and Plazmic Content Developers Kit for Blackberry®.

Such manual steps depend on the particular development tool, and typically include exporting the developed content from the content development tool in a publishable format, publishing the exported content onto a web server, opening a browser on the wireless communication device or on the device simulator, entering the URL of the published content into the browser, then downloading the published content at the URL to the wireless communication device or device simulator for playback by the developer. It would be desirable to provide a solution that solves at least some of the challenges present in existing approaches to test media content developed for wireless communication devices.

BRIEF DESCRIPTION OF THE DRAWINGS

Further features and advantages of the disclosed embodiments will become apparent from the following detailed description, taken in combination with the appended drawings, in which.

It will be noted that throughout the appended drawings, like features are identified by like reference numerals.

DETAILED DESCRIPTION

Figure 1:
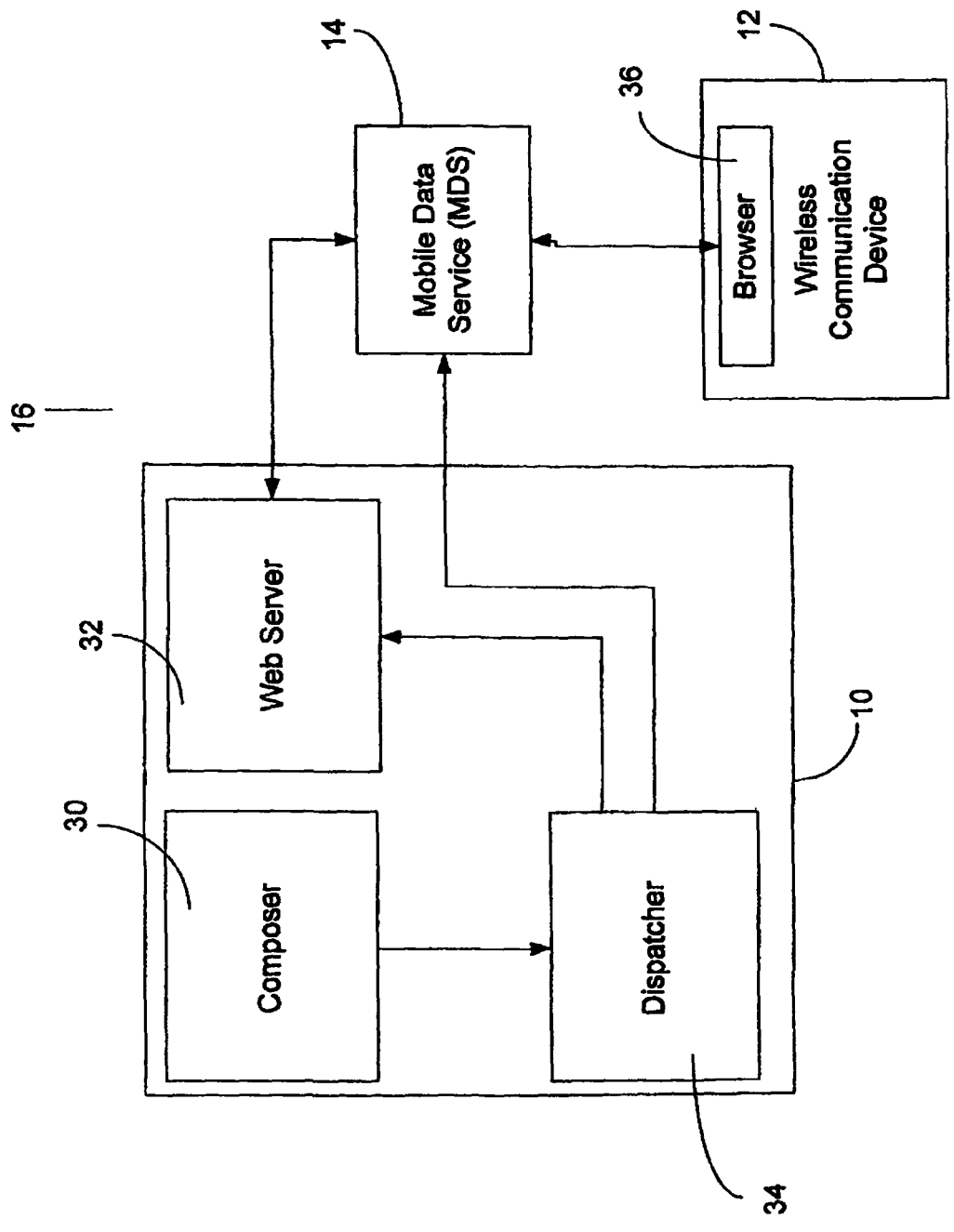
FIG. 1(a) is a block diagram of a media content development system for a wireless communication device, a mobile data service, and a wireless communication device, wherein the system comprises a composer module, a dispatcher module, and a web server.
FIG. 1(b) is a block diagram of a media content development system comprising a composer module, a dispatcher module, a web server, a mobile data service simulator module, and a wireless communication device simulator module.
Figure 1:
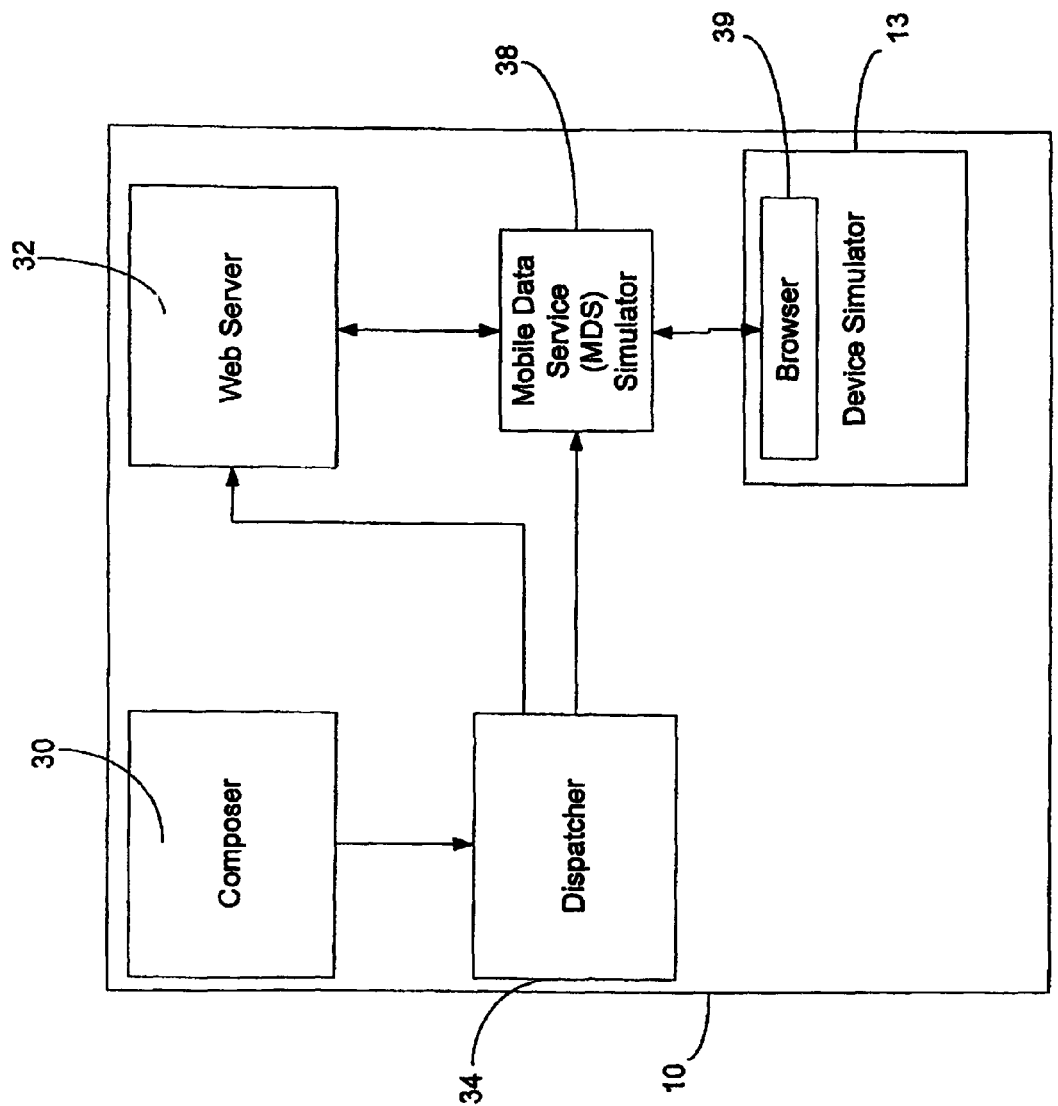

According to an aspect, there is provided a method of testing media content developed for a wireless communication device. The method comprises the steps of receiving a media content simulation request, publishing media content onto a web server and transmitting to a wireless communication device or a wireless communication device simulator the URL and instructions to open a web browser and access the URL thereby downloading the media content from the web server. The media content is published on a path.

According to another aspect, there is provided a computer readable memory having recorded thereon statements and instructions for execution on a computer to carry out a method of testing media content developed for a wireless communication device. The method comprises the steps of receiving a media content simulation request, publishing media content onto a web server and transmitting to a wireless communication device or a wireless communication device simulator the URL and instructions to open a web browser and access the URL thereby downloading the media content from the web server. The media content is published on a path.

According to another aspect, there is provided an apparatus for testing media content developed for a wireless communication device. The apparatus comprises a media content composer module, a web server and a dispatcher module programmed to: receive a media content simulation request from the composer module, publish media content developed on the composer module onto the web server and transmit to a wireless communication device or a wireless communication device simulator the URL and instructions to open a web browser and access the URL thereby downloading the media content from the web server. The media content is published on a path.

According to another aspect, there is provided a communications network. The communications network comprises a wireless communication device, a mobile data service and an apparatus for testing media content developed for a wireless communication device. The apparatus comprises a media content composer module, a web server and a dispatcher module programmed to receive a media content simulation request from the composer module, publish media content developed on the composer module onto the web server and transmit to the mobile data service the URL and instructions to the wireless communication device or a wireless communication device simulator to open a web browser and access the URL thereby downloading the media content from the web server. The media content is published on a path.

According to one aspect, there is provided a method of testing media content developed for a wireless communications device, including rich media content, and a computer readable media having recorded thereon instructions for carrying out the method. Upon receipt of a simulation request by a user, the method publishes media content developed on a composer program onto a web server wherein the published content has a uniform resource locator (URL) associated thereto; then instructs a wireless communication device or a wireless communication device simulator to open a web browser and download the published content from the web server at the URL. Prior to content being published, the method can also export media content on the composer program into a publishable format. By automating these steps, the method reduces the tedium associated with a user having to perform these steps manually.

According to another aspect, the method can open a simulator session before a user requests a simulation to be performed, thereby reducing the time required for the simulator to perform the simulation.

According to yet another aspect, a device-side playback control application is provided that interfaces a control panel application with a content playback application programming interface of a web browser on a wireless communication device or a wireless communication device simulator. In one aspect, the playback control application is resident on the device or device simulator and enables the control panel to be located external to the device or device simulator and control playback of developed content on the web browser of the device or device simulator. In another aspect, the playback control application can be pushed to a wireless communication device that does not have the application resident thereon, or new versions of the application can be pushed to devices.

Enterprise Solution Application Development System for Wireless Devices

Referring to FIGS. 1(a) and 1(b), a rich media content development tool 10 is provided for content developers to develop rich media content for a wireless communication device 12, and test developed content either on the wireless communication device 12 or on a simulator 13 of such device 12. An example of the wireless communication device 12 is the Blackberry® brand of wireless communication devices manufactured by Research in Motion (RIM).

The rich media development tool 10 is part of an application development system 16 for a wireless communication device enterprise solution. The application development system 16 provides organizations with the means to build, deploy and manage application for the device enterprise solution. A prior art example of such a system 16 is the Blackberry Mobile Data System v. 4.1 by RIM. The system 16 includes developer tools such as the rich media content development system 10, a mobile data service (MDS) 14, and application development system software (not shown) for the wireless communication device 12.

Figure 3:
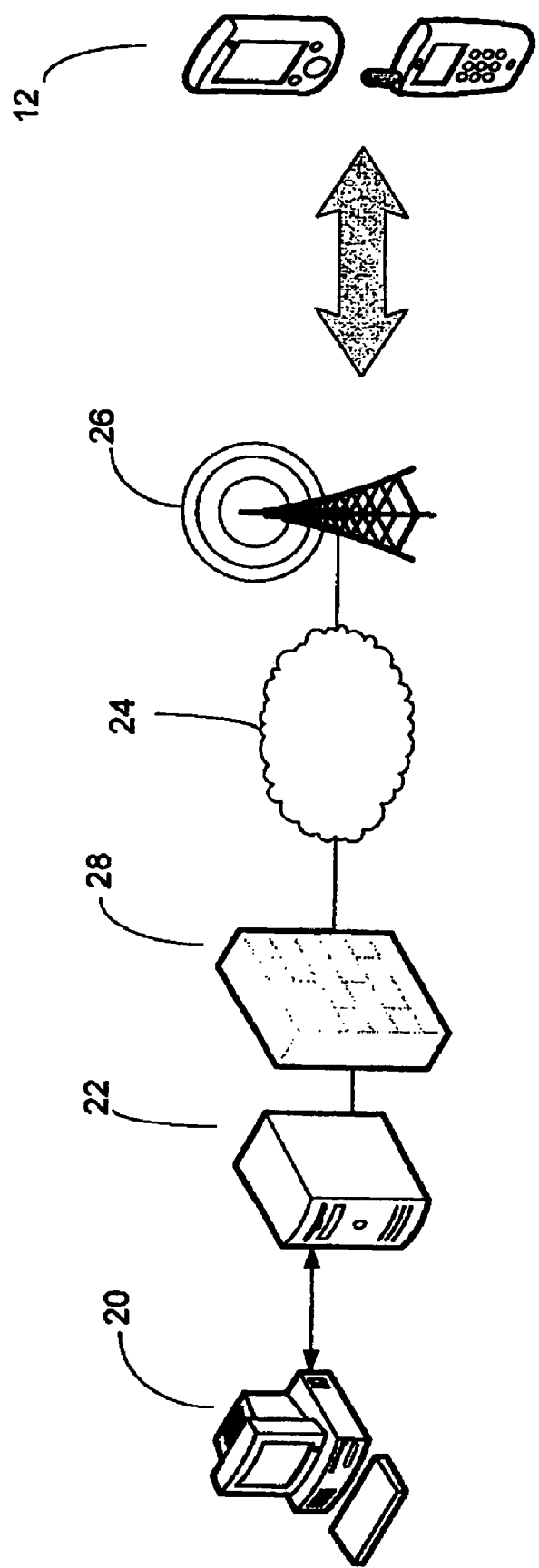
FIG. 3 is a block diagram of a communications network for implementing the test shown in FIG. 2(a).

Referring to FIG. 3, the development tool 10 is a software program that resides on a client computer 20. The MDS 14 resides on an enterprise server 22 communicative with the client computer 20. The MDS 14 communicates wirelessly with one or more wireless communication devices 12 via the Internet 24 and wireless networking equipment 26 communicative with the Internet 24 in a manner that is well known in the art. A firewall 28 is provided to protect the application and enterprise servers 20, 22 from Internet-based attacks.

The MDS 14 is responsible for managing interactions and requests between wireless communication devices 12 and enterprise applications. The MDS 14 includes an administrative and management service that deals with policies, such as those specifying allowed applications for users, and services available to applications. The MDS 14 also includes a provisioning service that controls and manages which application users can download to the wireless communication devices 12. The MDS 14 also includes a data optimization service that transforms data for efficient wireless transmission and use on mobile devices 12, a connection service that provides TCP/IP and HTTP-based connectivity between MDS Java applications and MDS browser applications and enterprise applications. The Blackberry MDS Services for the Blackberry Mobile Data System 4.1 is an example of a commercially available MDS that can be used with the content development tool 10.

Media Content Development Tool for Testing on Wireless Communication Device

Referring to FIG. 1(a) and according to one embodiment, the development tool 10 is a software program configured to automatically simulate developed content on a wireless communication device 12. The development tool 10 is a collection of graphical user interfaces and command line tools that enable content developer to build, test, and simulate (run) mobile media content such as 2D graphical scalable vector graphics (SVG) content for viewing on a web browser of the wireless communication device 12. The development tool 10 includes the following program modules:

a composer module 30;
a web server 32; and
a dispatcher module 34

The composer module 30 is a graphical authoring computer program for developing rich media content, and particularly, SVG content. Rich media is a term used to describe a broad range of interactive digital media that exhibit dynamic motion, taking advantage of enhanced sensory features such as video, audio and animation. The Composer program for the Blackberry Mobile Data System 4.1 an example of a commercially available composer module that can be used with the content development tool 10 of this embodiment.

The web server 32 is a computer program that is responsible for accepting HTTP requests from clients, which are known as Web browsers, and serving them Web pages, which are usually HTML documents and linked objects (images, etc.). Such a web server 32 is well known in the art and is thus not described in detail here.

The dispatcher module 34 is a computer program that executes the steps necessary to simulate developed content on the wireless communication device 12. The dispatcher module 34 is communicative with the composer module 30 to receive a "simulation" request initiated by the content developer clicking an icon in the composer module 30, and is communicative with the MDS 14 to instruct the MDS 14 to locate the wireless communication device 12 and instruct the device 12 to access and download the developed content from the web server 32.

Referring to FIG. 2(a) and FIGS. 5 to 8, a content developer that has developed media content that he or she wants to test on the wireless device 12 will have first selected the wireless device 12 on which to simulate the developed content; this selected wireless device 12 has a device identifier or "PIN" that is entered into the development tool 10. The user clicks a "simulator" icon (not shown) on a control panel of the composer module 30 (step 40). When this icon is clicked, a series of steps is executed by the development tool 10 that results in the wireless device obtaining and running the developed content. First, the composer module 30 exports the developed content into an publishable format, e.g. scalable vector graphics format (step 41). Then, the composer module 30 sends a request to the dispatcher module 34 that contains the pathname of the exported file and the PIN of the device or device simulator to which the content is to be pushed. In response to this request, the dispatcher module 34 transmits the exported content to the web server 32 for publication (step 42). The web server 32 receives and publishes the content under a certain path, and the dispatcher module 34 determines the Universal Resource Locator (URL) identifier associated with that path.

After the content has been published, the dispatcher module 34 sends a Wireless Application Protocol (WAP) service load request to the MDS 14 containing the URL, the PIN of the wireless device 12, (step 44 and FIG. 6), instructions for the device 12 to open a web browser 36 on the device 12 and access the URL at the web server 32 (Step 46 and FIG. 7), and an "execute high" priority for these instructions, which tells the browser to load the URL immediately. Upon receipt of this information, the MDS 14 will "push" the data to the device 12 via the network as shown in FIG. 3. When the device 12 receives the pushed data, the device 12 will open its web browser 36 and access the web server 32 with the URL. When the URL has been accessed, the device 12 will download the media content located at that URL, and run the media content on the wireless device 12 (Step 48 and FIG. 8).

When the device 12 is connected to the client computer 20 (eg. via Bluetooth or by USB), the device PIN can be determined automatically in a manner as is known in the art.

The use of the MDS 14 to locate and communicate with the wireless communication device 14, and use of a web browser on the device 12 to access a web server and download content from a URL on the web server 32 are well known in the art and thus not described in detail here.

The WAP service load request is considered an aggressive means to communicate with the wireless device 12, as the request is given an "execute high" priority. When the MDS 14 receives such a request, it will override any current application that is running on the wireless device 12 and cause the device 12 to execute the commands in the WAP service load request, which in this embodiment is to open the web browser 36 and download and run media content from the web server 32. However, it is within the scope of this embodiment for the dispatcher module 34 to send requests via the MDS 14 in a different manner.

The wireless communication device 12 is described in further detail below under the heading "Wireless Communication Device".

Wireless Communication Device

Figure 4:
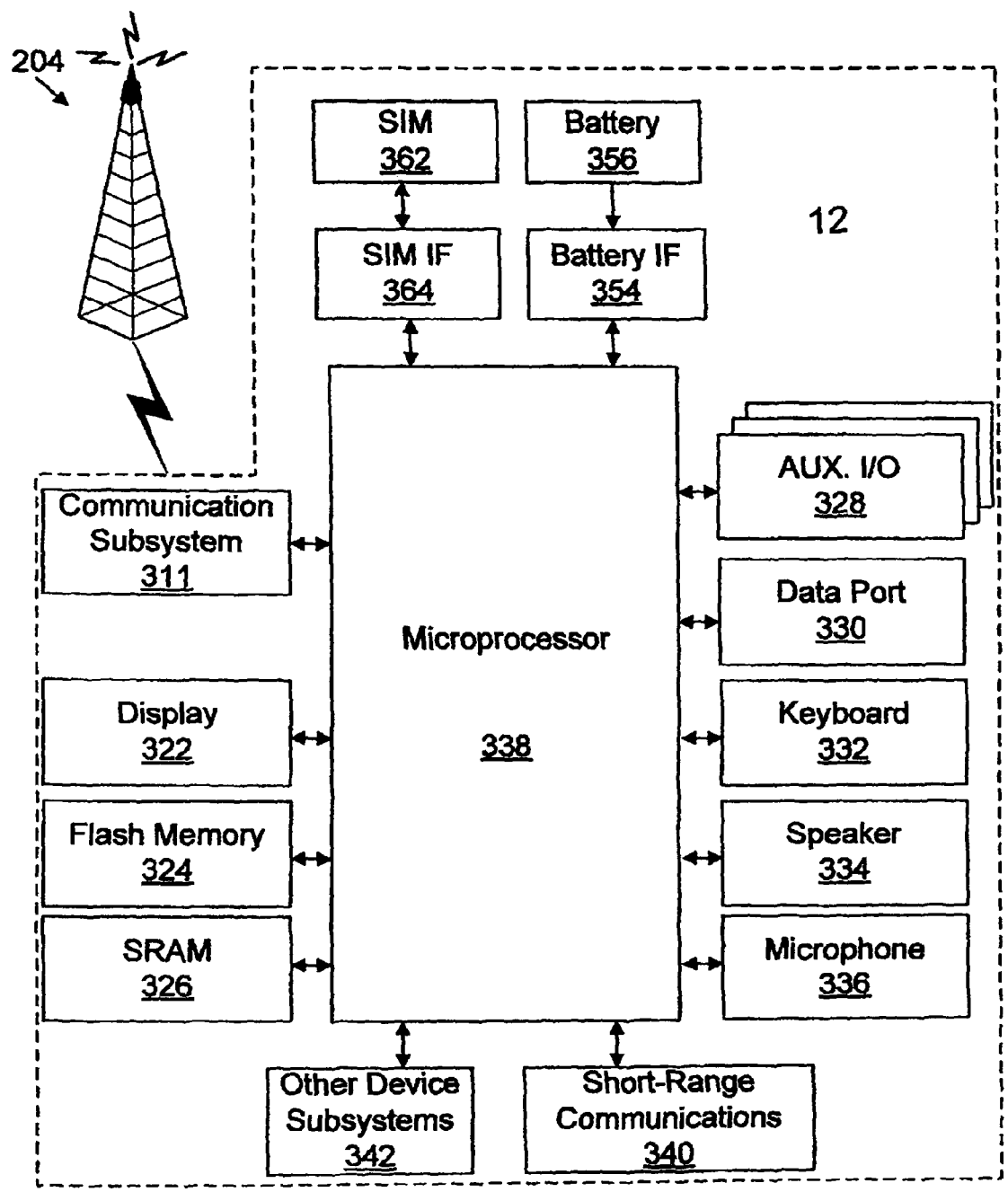
FIG. 4 is a block diagram of a preferred wireless communication device adapted for implementing the test shown in FIG. 2(a).
Figure 5:
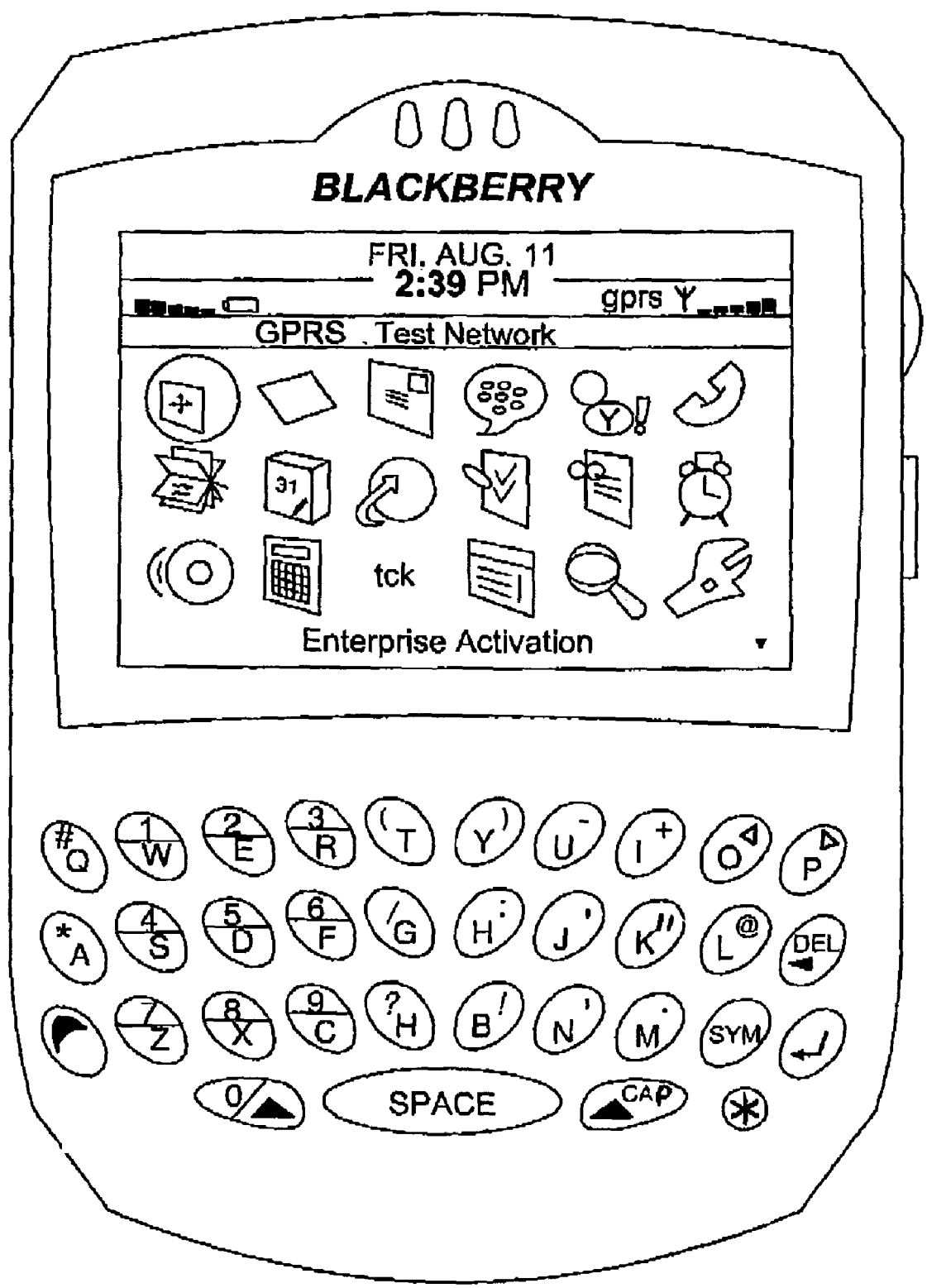
FIG. 5 is a screenshot of the wireless communication device before the test begins.
Figure 6:
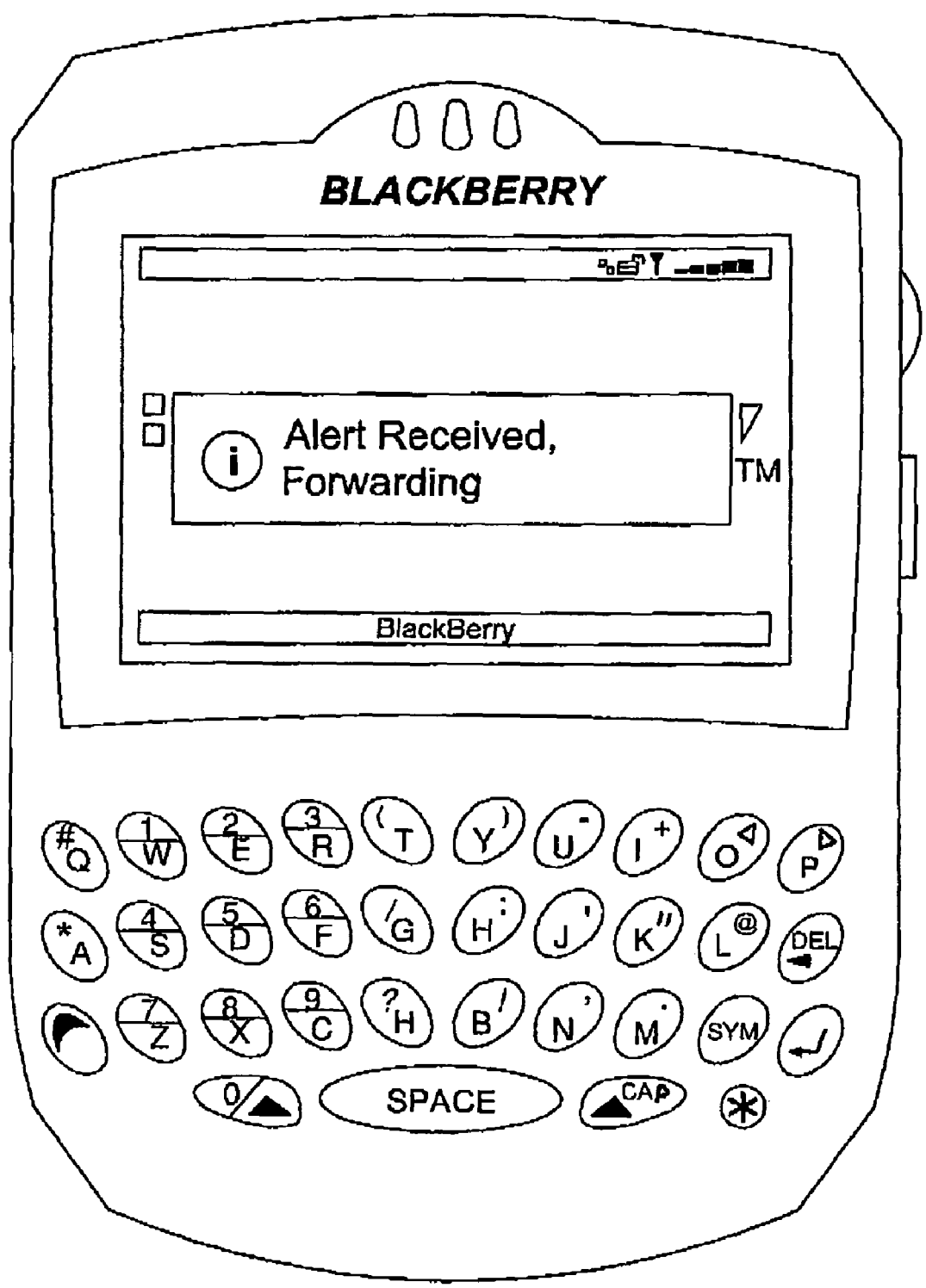
FIG. 6 is a screenshot of the wireless communication device receiving instructions from the media content development and testing system to begin the test.
Figure 7:
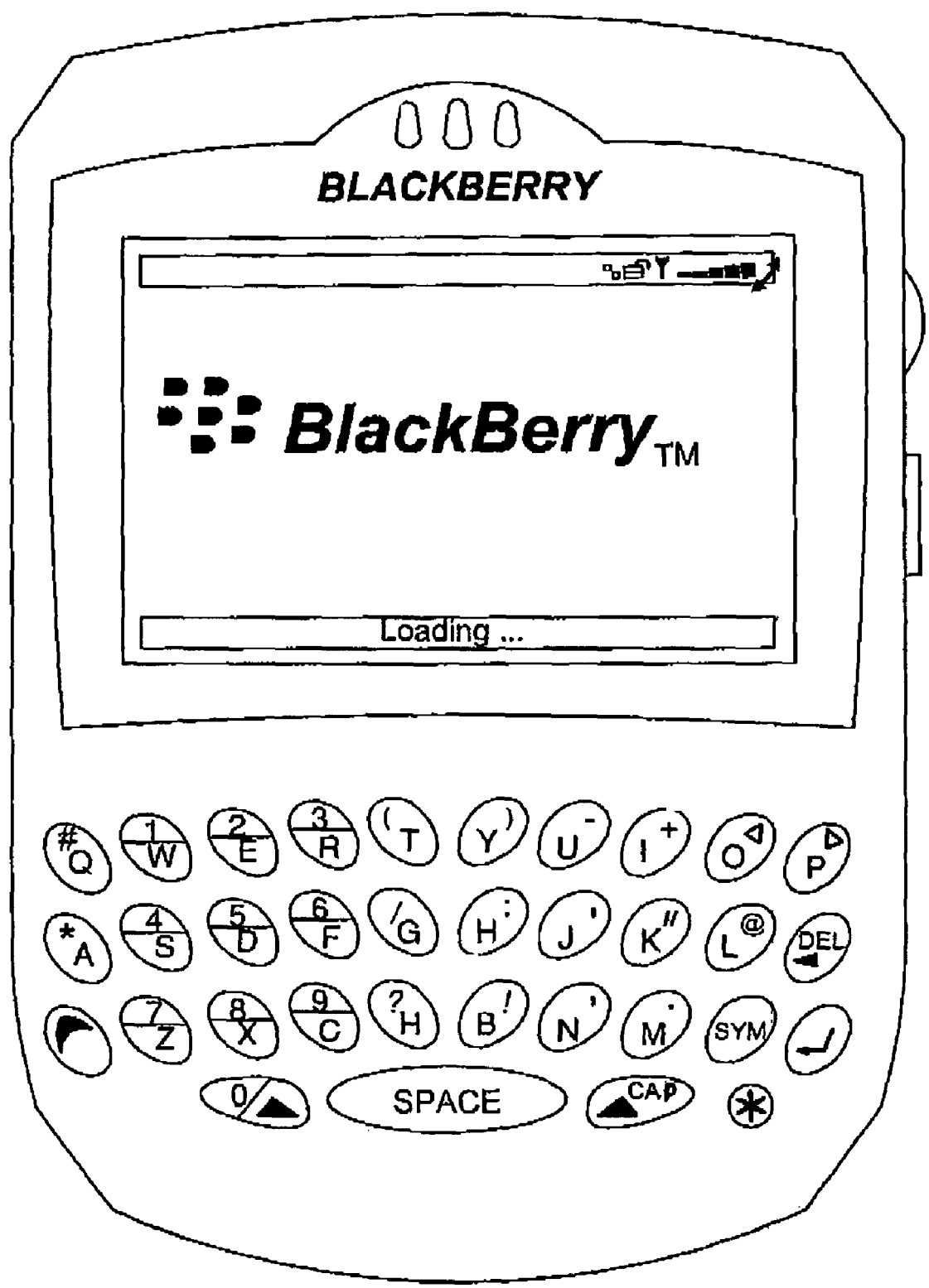
FIG. 7 is a screenshot of the wireless communication device launching a web browser as part of the test.

One example of the wireless communication device 12 adapted in accordance with this embodiment is shown in FIG. 4. Device 12 is a two-way communication device having at least voice and advanced data communication capabilities, including the capability to communicate with other computer systems. Depending on the functionality provided by device 12, it may be referred to as a data messaging device, a two-way pager, a cellular telephone with data messaging capabilities, a wireless Internet appliance, or a data communication device (with or without telephony capabilities). Device 12 may communicate with any one of a plurality of fixed transceiver stations 100 within its geographic coverage area.

Device 12 will normally incorporate a communication subsystem 311, which includes a receiver, a transmitter, and associated components, such as one or more (preferably embedded or internal) antenna elements and, local oscillators (LOs), and a processing module such as a digital signal processor (DSP) (all not shown). As will be apparent to those skilled in field of communications, particular design of communication subsystem 311 depends on the communication network in which device 12 is intended to operate.

Network access is associated with a subscriber or user of device 12 and therefore, depending on network type, the device 12 may require a Subscriber Identity Module or "SIM" card 362 to be inserted in a SIM IF 364 in order to operate in the network. Device 12 is a battery-powered device so it also includes a battery IF 354 for receiving one or more rechargeable batteries 356. Such a battery 156 provides electrical power to most if not all electrical circuitry in device 12, and battery IF 154 provides for a mechanical and electrical connection for it. The battery IF 154 is coupled to a regulator (not shown) which provides power V+ to all of the circuitry.

Device 12 includes a microprocessor 338 which controls overall operation of device 12. Communication functions, including at least data and voice communications, are performed through communication subsystem 311. Microprocessor 338 also interacts with additional device subsystems such as a display 322, a flash memory 324 or other persistent store, a static random access memory (SRAM) 326, auxiliary input/output (I/O) subsystems 328, a serial port 330, a keyboard 332, a speaker 334, a microphone 336, a short-range communications subsystem 340, and any other device subsystems generally designated at 342. Some of the subsystems shown in FIG. 4 perform communication-related functions, whereas other subsystems may provide "resident" or on-device functions. Notably, some subsystems, such as keyboard 332 and display 322, for example, may be used for both communication-related functions, such as entering a text message for transmission over a communication network, and device-resident functions such as a calculator or task list. Radio and embedded software and JVM (collectively, "main operating system (OS) firmware"), as well as Java applications, are preferably stored in a persistent store such as the flash memory 324, which may alternatively be a read-only memory (ROM) or similar storage element (not shown). Those skilled in the art will appreciate that objects and other data generated by the main OS firmware, specific device applications, or parts thereof, may be temporarily loaded into a volatile store such as the SRAM 326.

While wireless device 12 operates on the Java platform and utilizes JVM and Java applications, other software platforms utilizing different virtual machines/application-framework and applications as is known in the art can be substituted.

Microprocessor 338, in addition to its operating system functions, preferably enables execution of software applications on device 12. A predetermined set of applications which control basic device operations, including at least data and voice communication applications, will normally be installed on device 12 during its manufacture. A preferred application that may be loaded onto device 12 may be a personal information manager (PIM) application having the ability to organize and manage data items relating to the user such as, but not limited to, instant messaging (IM), e-mail, calendar events, voice mails, appointments, and task items. Naturally, one or more memory stores are available on device 12 and SIM 362 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on device 12 with respect to such items. This is especially advantageous where the host computer system is the mobile station user's office computer system. Additional applications may also be loaded onto device 12 through network 204, an auxiliary I/O subsystem 328, data port 330, short-range communications subsystem 340, or any other suitable subsystem 342, and installed by a user in SRAM 326 or preferably the non-volatile store 324 for execution by microprocessor 338. Such flexibility in application installation increases the functionality of device 12 and may provide enhanced on-device functions, communication-related functions, or both. For example, secure communication applications may enable electronic commerce functions and other such financial transactions to be performed using device 12.

In a data communication mode, received information data such as a text message, an e-mail message, or web page download will be processed by communication subsystem 311 and input to microprocessor 338. Microprocessor 338 will preferably further process the information for output to display 322 and/or to auxiliary I/O device 328. A user of device 12 may also compose data items, such as e-mail messages, for example, using keyboard 332 in conjunction with display 322 and possibly auxiliary I/O device 328. Keyboard 332 is preferably a complete alphanumeric keyboard and/or telephone-type keypad. These composed items may be transmitted over a communication network through communication subsystem 311 or short range communication subsystem 340.

For voice communications, the overall operation of device 12 is substantially similar, except that the received signals would be output to speaker 334 and signals for transmission would be generated by microphone 336. Alternative voice or audio I/O subsystems, such as a voice message recording subsystem, may also be implemented on device 12. Although voice or audio signal output is preferably accomplished primarily through speaker 334, display 322 may also be used to provide an indication of the identity of a calling party, duration of a voice call, or other voice call related information, as some examples.

Data port 330 in FIG. 4 is normally implemented in a personal digital assistant (PDA)-type communication device for which synchronization with a user's desktop computer is a desirable, albeit optional, component. The data port 330 can be serial or USB. Data port 330 enables a user to set preferences through an external device or software application and extends the capabilities of device 12 by providing for information or software downloads to device 12 other than through a wireless communication network. The alternate download path may, for example, be used to load an encryption key onto device 12 through a direct and thus reliable and trusted connection to thereby provide secure device communication.

Short-range communications subsystem 340 of FIG. 4 is an additional optional component which provides for communication between device 12 and other different systems or devices, which need not necessarily be similar devices. For example, subsystem 340 may include an infrared device and associated circuits and components, or a Bluetooth™ communication module to provide for communication with similarly-enabled systems and devices. Bluetooth™ is a registered trademark of Bluetooth SIG, Inc.

Media Content Development Tool Having Wireless Device Simulator

Referring to FIG. 1(*b*) and according to another embodiment, the development tool 10 is provided with a mobile data service simulator (MDS simulator) 38 and the wireless communication device simulator 13. Both the MDS simulator 38 and the device simulator 13 are computer programs resident on the client computer 20 that emulate the functionality of the MDS 14 and wireless device 12. These simulators 13, 38 provide the content developer with the option of testing the developed content on either the wireless communication device 12 or on the device simulator 13. The device simulator 13 simulates the entire wireless device handheld experience, and can be used by developers who do not have access to a wireless communication device 12 to test their developed content entirely on the client computer 20 instead.

Figure 2A:
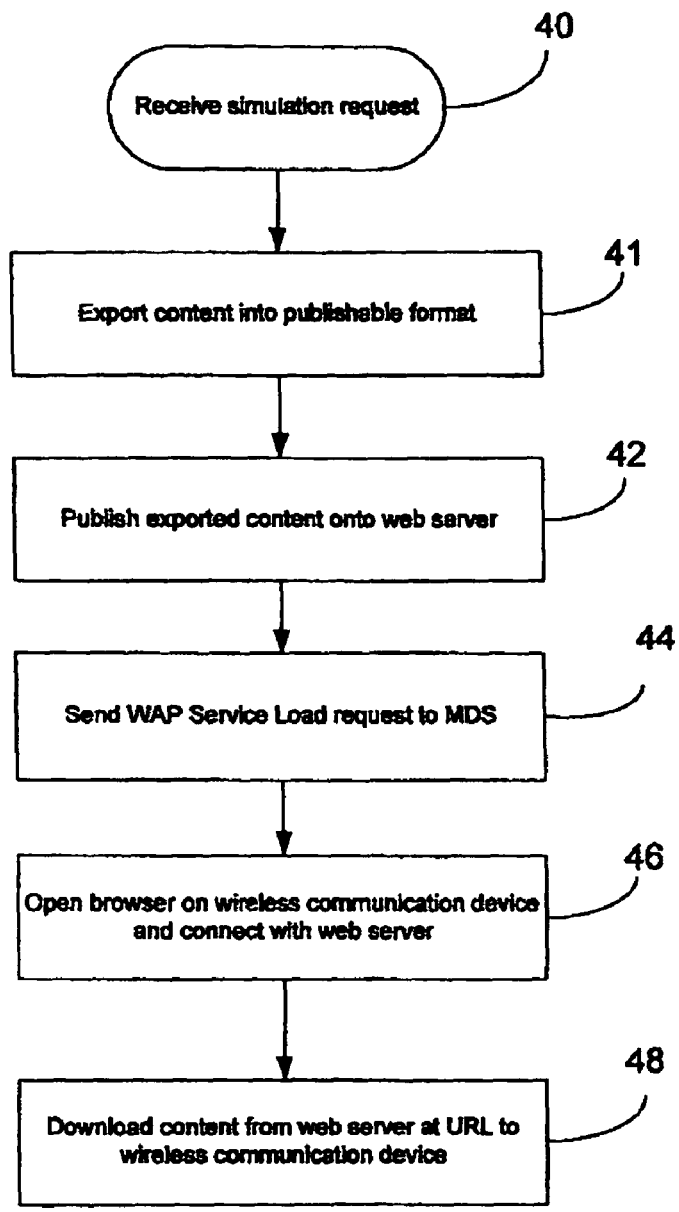
FIG. 2(a) is a flowchart of the steps carried out by the content development and testing system to test developed content on a wireless communication device
Figure 2B:
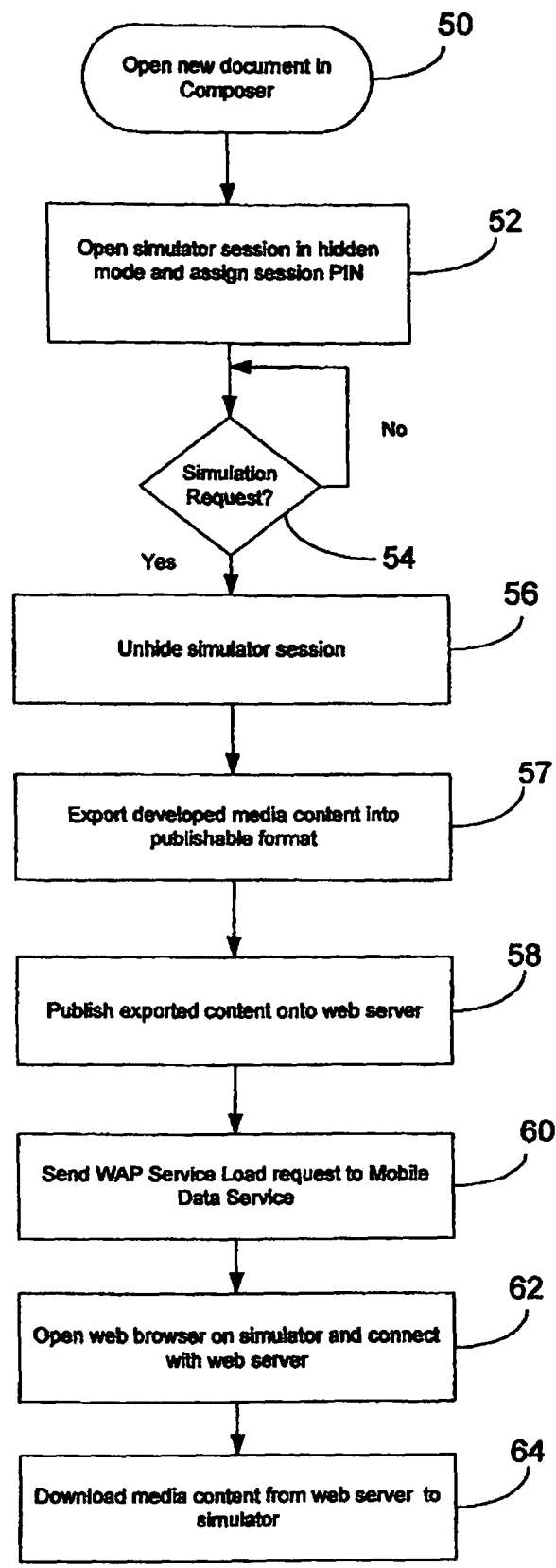
FIG. 2(b) is a flowchart of the steps carried out by the content development and testing system to test developed content on a device simulator.

Referring to FIG. 2(*b*), the developer working on the composer module 30 will have to select whether to run a simulation test on a wireless communication device 12 or on the simulator 13. When the developer opens a new document in the Composer module 30 (Step 50), the developer will be prompted to select testing media content on a wireless communication device 12 or on the simulator 13. When the developer selects the device 12, he will be prompted to enter the PIN of the device 12; after entering this PIN and clicking the "Simulation" icon, the development tool executes the steps as described for the first embodiment.

When the developer selects to run the test on the simulator 13, the dispatcher module 34 assigns a simulator PIN associated with the current composer document, then instructs the simulator 13 to open a new simulator session having the session PIN (Step 52) and place the session in hidden mode, i.e. hidden from the developers view. Opening a new simulator session in prior art device simulators can take several minutes, and can be frustrating to developers who must wait each time they want to test their developed content. In this embodiment, the dispatcher 34 causes a simulator session to be opened and ready for use before the developer initiates a simulation request, thereby reducing the wait time for the simulation test to begin running to seconds instead of minutes.

When the developer clicks the simulation icon in the composer program 30 (Step 54), a series of steps are executed by the development tool 10:

- a simulation request is sent to the dispatcher module 34, which then instructs the simulator 13 to unhide the simulator session, i.e. bring the session to the foreground of the client computer's display (Step 56);
- the composer 30 exports the developed content in the document into a publishable format, then sends a request to the dispatcher 34 containing the pathname of the exported file and the simulator session PIN; (step 57)
- the dispatcher 34 then transmits the exported content to the web server 30 for publication (Step 58);
- the web server 30 receives the exported content, and publishes the content under a path having an associated URL;
- the dispatcher 34 sends a WAP service load request to the MDS simulator 38 containing the URL, the simulator session PIN, and instructions to for the simulator 13 to open the web browser 39 on the simulator 13 and access the URL at the web server 32 (Steps 60 and 62 and FIG. 6). The MDS simulator 38 then simulates a "content push" to the device simulator 13 with this information.

Figure 8:
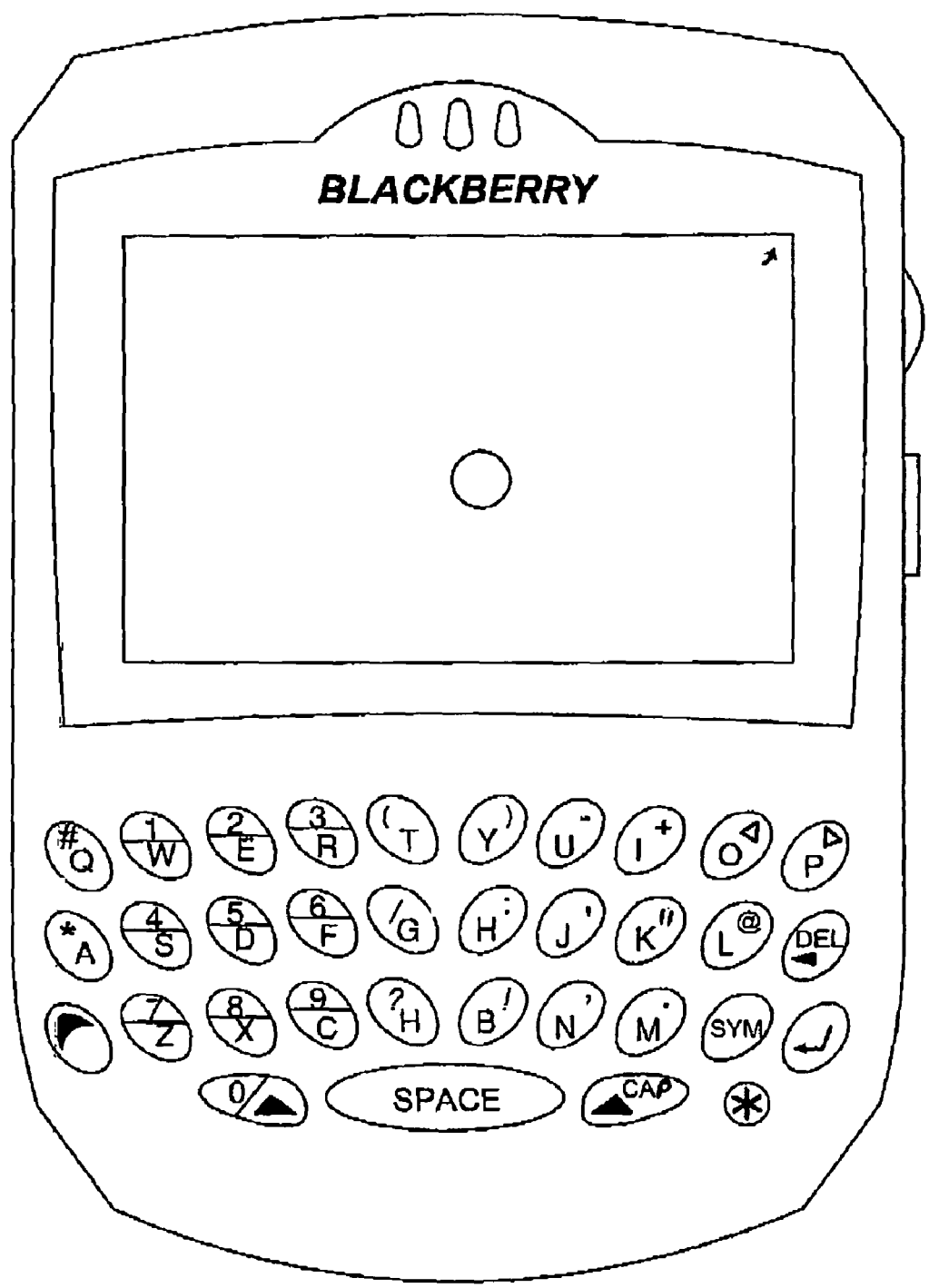
FIG. 8 is a screenshot of the wireless communication device playing the media content as part of the test.

When the URL has been accessed, the simulator 13 will download the media content located at that URL (FIG. 7), run the media content for display on the client computer 20 (step 64 and FIG. 8).

Opening and Managing Multiple Simulator Sessions

The effectiveness of a developer's edit-and-test cycle, in which a developer makes changes to his or her work and immediately tests those changes, is improved with the use of the device simulator 13. Unfortunately, the improvement is not fully realized if the device simulator 13 has a slow start-up time. Therefore, as described above, a simulator session is opened and kept in hidden mode when a composer document is opened by the developer, and before the developer requests a simulation. "Pre-opening" a simulator session has been found to significantly reduce the time required to run a simulation.

While pre-opening a simulator session works well when the developer works on a single composer document and only wants to run a single simulation, the developer may want to edit-and-test content on the same document repeatedly, or test the same content on different types of wireless communication devices. To start a new simulator session each time the developer wants to test content would be very inefficient. On the other hand, an attempt to re-use the same simulator session each time would preclude the option of testing on different device types (it is assumed that the device type is fixed for any given simulator session).

Therefore, in accordance with an another embodiment, multiple simulator sessions can be opened at one time on the development tool 10. For example, multiple simulator can be opened by the development tool 10 when the developer opens a document in the composer 30. Each opened simulator session is assigned a unique identifier which the composer 30 uses to identify the session and separate from the simulator PIN. The session identifiers and the PINs which they map to are recorded in a data repository in the dispatcher 34. This enables the dispatcher 34 to re-use simulator PINs as needed while keeping the simulator session identifiers unique.

Associated with the running of multiple simulator sessions at one time is a problem with port conflicts. Simulator sessions running on the device simulator 13, and the device simulator 13 itself, may reserve specific port numbers in order to communicate with other programs. In many cases these port numbers can be assigned dynamically as is known in the art in order to avoid conflicts. However, the quantity of available ports assigned to development tool 10 is a limited resource and therefore needs to be managed carefully to avoid port conflicts.

In this connection, the dispatcher 34 is further programmed to manage the use of multiple simulator sessions as well as allocating port numbers as needed when there are multiple simulator sessions running on a single client computer 20.

The dispatcher 34 is provided with a limited range of port numbers which it can assign; the dispatcher 34 has a repository which lists each port number and the availability of the associated ports. When a new simulator session is started the dispatcher 34 assigns the required number of ports to that session and updates the repository to indicate that the assigned ports are no longer available. When a simulator session is closed, the dispatcher 34 updates the repository to indicate that the ports used for the closed session are now available.

Figure 9:
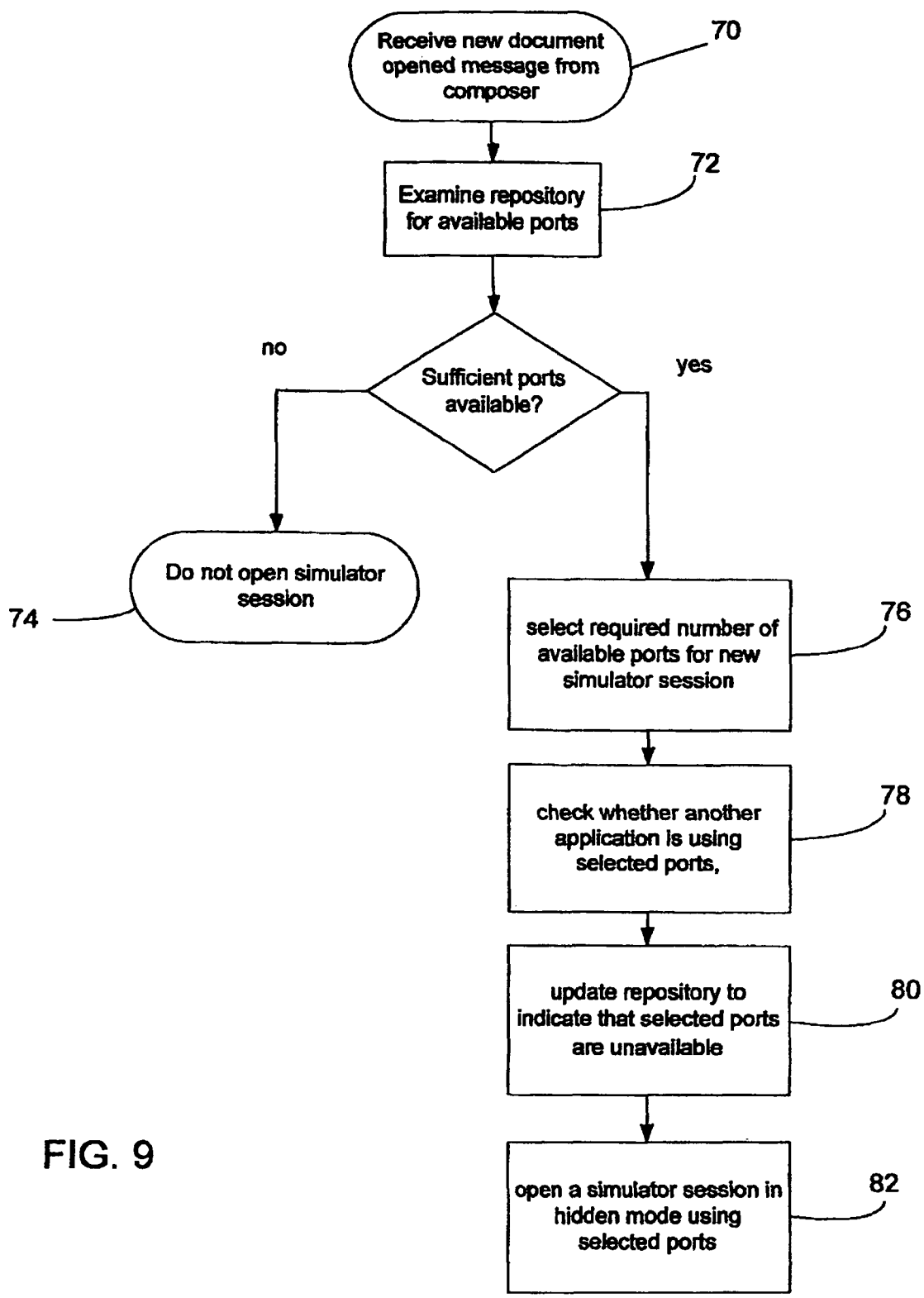
FIG. 9 is a flow chart of steps carried out by the dispatcher module to manage multiple simulation sessions.

Referring to FIG. 9 and when the content developer opens a document on the composer application 30 (step 70), the dispatcher 34 tries to open one or more new simulator sessions. The dispatcher 34 examines the repository for available ports (step 72). In this embodiment, each simulator session requires three ports: one port for communicating with the MDS simulator 38, and two ports for receiving and transmitting data to a control panel of the simulator session. When there is an insufficient number of ports available, the device simulator 13 does not open a new session (step 74).

When there is a sufficient number of ports, the dispatcher 34 selects three available ports for use with a new simulator session (step 76), and checks to see whether another application is using those ports (step 78). Such checking may be required as the ports may already be in use by other applications on the client computer 20. As there is no correlation between the three port numbers needed for a simulation in this embodiment, the assignment of each port number is treated independent of the other. Therefore, the dispatcher 34 will select and check each port one at a time. This process continues until a total of three available and unused ports are found. Then, the dispatcher 34 assigns the three ports to the simulator session and the repository is updated (step 80). When using the device simulator 13, the dispatcher 34 then instructs the device simulator 13 to open a new simulation session using the three assigned ports. Upon receipt of the such instruction, the device simulator 13 opens a simulator session in hidden mode using the three ports (step 82).

When the content developer wants to test his developed content and clicks the "simulation" icon in the composer document, a simulation request is sent to the dispatcher 34. The dispatcher 34 attempts to service that request by first checking whether there is an unused hidden session, and if yes, to bring the hidden session forward, and then to send a WAP service load to the MDS simulator 38 with the session PIN of the unused hidden session. Consequently, the unused hidden session accesses the web server and downloads the developed content onto the simulator session.

If the dispatcher 34 cannot find an unused hidden session, it will attempt to open a new simulator session, in the manner as described above.

The developer may on occasion want to run multiple simulations at one time. For example, the developer may want to test the developed content on multiple device types or multiple families of device types and request such when the document is opened. In this connection, the dispatcher 34 is programmed to pre-start a new simulator session for each device type in a set of predefined device types when the development tool 10 is started up. For example, the dispatcher 34 may be provided with a list of each device in the Blackberry 71XX family of devices, and open a separate simulator session for each 71XX device in the family. Or, the dispatcher 34 is programmed to start up a session for each family of device types, e.g. a 7100 simulator session for the 71XX family. Opening separate sessions for each device type is useful where differences between the devices would affect the playback of the developed content; for example, different devices in the Blackberry 71XX family may have different application behaviour that requires certain developed application content to be tested on each device type. However, the 71XX family of devices all have the same screen size, so developed graphical web content can be tested on a single simulator session for the entire 71XX family.

Each opened simulator session is assigned a unique identifier which is stored in the repository. When the developer requests multiple simulations, the dispatcher 34 will check the repository for available simulator sessions, select the required number of simulator sessions, then instruct the each session to access the URL of the published content in the manner as described above.

Content Playback Control on Device and Device Simulator

Figure 10:
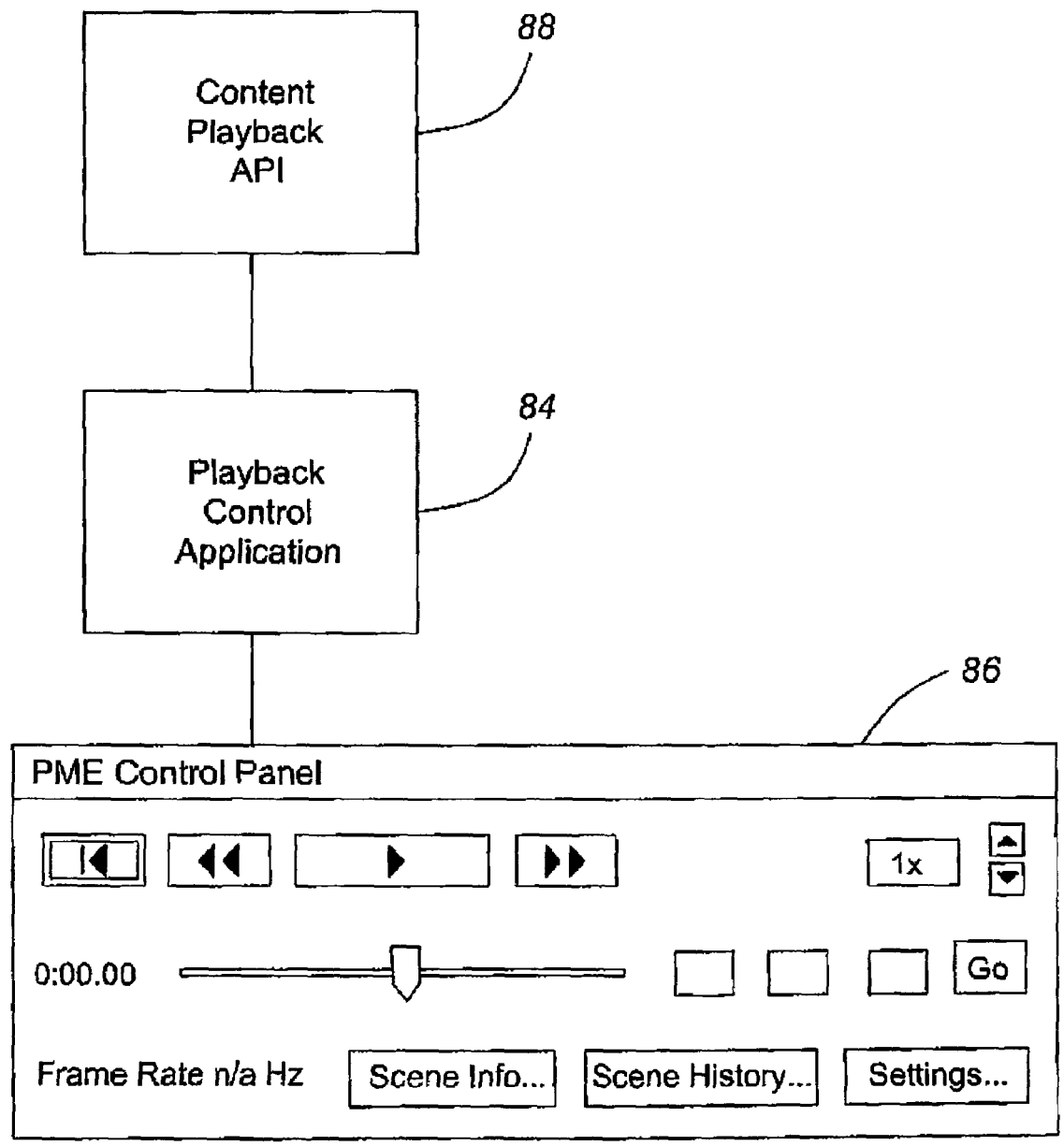
FIG. 10 is a screenshot of a control panel for the simulator module.

Referring now to FIG. 10, a playback control application or "run-time agent" 84 is provided on the device 12 or on the device simulator 13 and provides an interface between a control panel application 86 and a content playback application program interface (API) 88 of the web browser on the device 12 or device simulator 13. The playback control application 84 is also communicative with the dispatcher 34 and notifies the dispatcher 34 when the device 12 or device simulator 13 is ready to handle a wireless data push.

The end user interface (not shown) on the device 12 or device simulator 13 has a very limited number of playback controls, and would not be satisfactory for a developer seeking to test developed content. The following table is a high-level description of the content playback API functions that deal with the browser content currently being displayed on the device 12 or device simulator 13. In this embodiment, the media player is referred to as the "Media Engine" and the API is written in Java 2 Micro Edition (J2ME). However, any media player of time-based content would provide a similar API and can be readily substituted.

TABLE 1

Content Playback API functions

| Function name | Parameters | Description |
| --- | --- | --- |
| getState | (none) | Returns the current playback state of the player. |
| startPlayer | (none) | Starts playback. |
| stopPlayer | (none) | Stops playback. |
| getMediaTime | (none) | Returns the current media time. Here, media time is equivalent to scene time. |
| setMediaTime | time - the new value of scene time | Sets the media (scene) time. |
| getSceneProperties | (none) | Returns various scene properties, for example the version and MIME type of the content, and the URLs of any images, sounds, fonts, links, or other resources used in the scene. |

The control panel 86 is a software program that provides additional control over playback of the developed content. The control panel 86 is not resident on the device 12 or integrated with the device simulator 13, and instead resides on the client computer 20. As the control panel 86 is external to the device or device simulator 13, it must communicate with the content playback API 88 via the playback control application 84. In this embodiment, the control panel 86 and playback control application 84 communicate via a user datagram protocol (UDP) socket connection. When the content developer tests content using the device simulator 13, the development tool 10 assigns two local ports (incoming and outgoing) on the client computer 20 to enable the control panel 86 to communicate with the content playback API in accordance with the port management steps described above. Alternatively, other communication socket protocols can be used to communicate between the control panel 86 and the playback control application 84, e.g. transmission control protocol (TCP); different numbers of ports may be required when using different protocols as will be apparent to one skilled in the art.

In the case of actual devices 12, Bluetooth, USB or other suitable data connections can be used to connect the device 12 to the client computer 20 in which the control panel 86 is resident thereby providing for communication means between the playback control application 84 and the control panel 86. This data connection can also be used to push the playback control application 84 to devices 12 that do not already have the application 84 resident thereon, or to send the latest version of the application 84 to the device 12. A data connection can also be established over the wireless network shown in FIG. 3 using the MDS 14; using the wireless network is particularly useful when the device 12 and the client computer 20 are in two physically different locations, e.g. when a developer at the client computer 20 wishes to demonstrate developed media content to another person located at a different location.

The following table lists features of the control panel 86 that are particularly useful for the content developers:

TABLE 2

Control Panel Features

| Feature name | Description |
| --- | --- |
| Go to start | Rewind the scene to the start. |
| Skip back | Skip back in time by a fixed offset. |
| Play/pause | Toggle the playback state. |
| Skip ahead | Skip ahead in time by a fixed offset. |
| Time throttle | Allows the user to select a playback speed. For normal playback select "1X". For half-speed select "1/2X". For double speed select "2X", and so on. |
| Display scene time | An up-to-date readout of the current scene time. |
| Timeline scrubber | Allows the user to rapidly select the scene time by dragging a slider control back and forth. The scene time is tied to the position of the slider control. |
| Go to arbitrary time | Allows the user to enter an arbitrary scene time to go to. |
| Display frame rate | An up-to-date readout of the current frame rate (e.g., in frames per second). |
| Scene properties | An information window listing various properties of the current scene, for example the version and MIME type of the content, and the URLs of any images, sounds, fonts, links, or other resources used in the scene. Scene information may also include file size, URL, title, and description. |
| Scene history | A list of the URLs of scenes previously loaded, up to and including the current one. The user can select from the list and press "Go" to load the selected URL. |
| Drag and drop | The user can drag a file onto the simulator and it will load into the player. If the file type is not recognized, the user receives an appropriate message. |

Via the two ports, the control panel 86 sends commands to the playback control application 84, which then relays the commands to the API 88. The following table lists the messages sent between the control panel and the playback control application (run-time agent) 84 in this embodiment:

TABLE 3 control panel messages to playback control application

| From | To | Message name | Parameters | Description |
| --- | --- | --- | --- | --- |
| Control Panel | Runtime Agent | play | (none) | Start playback at current position. |
| Control Panel | Runtime Agent | pause | (none) | Stop playback at current position. |

TABLE 3-continued control panel messages to playback control application

| From | To | Message name | Parameters | Description |
|---|---|---|---|---|
| Control Panel | Runtime Agent | changeRate | rate - a time acceleration factor (0.5 is half-time, 2.0 is double-time, etc.) | Change the rate of playback to the specified rate. |
| Control Panel | Runtime Agent | seek | time - a scene time value to go to | Go to the specified scene time. |
| Control Panel | Runtime Agent | skip | offset - the offset value corresponding to the desired difference in scene time (can be negative) | Advance the scene time by the specified offset. |
| Control Panel | Runtime Agent | requestSceneInfo | (none) | Request information about the current scene, with a response expected in the form of a sceneInfo message. |
| Runtime Agent | Control Panel | sceneTimeChanged | time - the new value of scene time | Notification that the scene time has changed. (These messages may be frequent, for example, as frequent as the frame rate). |
| Runtime Agent | Control Panel | rateChanged | rate - the new value of the time acceleration factor | Notification that the rate of playback has changed. (Normally in response to a changeRate message). |
| Runtime Agent | Control Panel | started | (none) | Notification that playback has started. |
| Runtime Agent | Control Panel | stopped | (none) | Notification that playback has stopped. |
| Runtime Agent | Control Panel | sceneInfo | Various scene properties, for example the version and MIME type of the content, and the URLs of any images, sounds, fonts, links, or other resources used in the scene. | Notification that scene information is available. (Response to a requestSceneInfo message). |
| Runtime Agent | Control Panel | clientInfo | version - the version of the runtime agent | Provides information about the runtime agent so that the control panel code can alter its behaviour if necessary based on the capabilities of the simulator. |

While the preferred embodiment of the invention has been illustrated and described, it will be appreciated that various changes can be made therein without departing from the scope and spirit of the invention.

What is claimed is:

1. A method in a development tool for testing media content developed for a wireless communication device, comprising:

receiving a media content simulation request at a dispatcher module from a composer module;

publishing by the dispatcher module media content onto a web server in response to the received simulation request, the media content published on a path;

transmitting to a wireless communication device, or a wireless communication device simulator, the path and a wireless application protocol (WAP) service load request to open a web browser and access the path thereby downloading and running the media content from the web server by sending the WAP service load request to a mobile data service (MDS), or to a MDS simulator, and pushing the path, or a uniform resource locator URL associated with the path, and the WAP service load request from the MDS, or MDS simulator, to the wireless communication device, or the wireless communication device simulator; and transmitting to the wireless communication device, or the wireless communication device simulator, a playback instruction for controlling playback of the media content running on the wireless communication device, or the wireless communication device simulator.

2. A method as claimed in claim 1 further comprising between receiving and publishing: exporting the media content into a publishable format.

3. A method as claimed in claim 1 wherein the content is rich media content.

4. A method as claimed in claim 1 wherein the WAP service load request comprises an identifier of the device, and the URL and instructions are pushed to the device having the identifier.

5. A method as claimed in claim 1 further comprises opening a simulator session before a simulation request is received.

6. A method as claimed in claim 5 wherein the simulator session is opened when a document in a media content composer program is opened.

7. A method as claimed in claim 6 further comprising hiding the simulator session after opening, then unhiding the simulator session when the simulation request is received.

8. A method as claimed in claim 6 further comprising opening multiple simulator sessions when a document in the composer program is opened.

9. A method as claimed in claim 8 wherein each simulator session uses at least one port, and the opening of each simulator session further comprises:

examining a repository for available ports;
selecting available ports for the simulator session; and
assigning the available ports to the simulator session.

10. A computer readable memory having recorded thereon statements and instructions for execution on a computer to carry out a method in a development tool for testing media content developed for a wireless communication device comprising the steps of:

receiving a media content simulation request at a dispatcher module from a composer module;

publishing by the dispatcher module media content onto a web server in response to the received simulation request, the media content published on a path; and transmitting to a wireless communication device or a wireless communication device simulator the path and a wireless application protocol (WAP) service load request to open a web browser and access the path thereby downloading and running the media content from the web server by sending the WAP service load request to a mobile data service (MDS), or to a MDS simulator, and pushing the path, or a URL associated with the path, and the WAP service load request from the MDS, or MDS simulator, to the wireless communication device, or the wireless communication device simulator; and transmitting to the wireless communication device, or the wireless communication device simulator, a playback instruction for controlling playback of the media content running on the wireless communication device, or the wireless communication device simulator.

11. An apparatus for testing media content developed for a wireless communication device, comprising:

a media content composer module for developing media content for the wireless communication device;

a web server;

a dispatcher module programmed to:

receive a media content simulation request from the composer module;

publish the media content developed on the composer module onto the web server, the media content published on a path in response to a received simulation request; and transmit to a wireless communication device or a wireless communication device simulator the path and a wireless application protocol (WAP) service load request to open a web browser and access the path thereby downloading and running the media content from the web server by sending the WAP service load request to a mobile data service (MDS), or to a MDS simulator, and pushing the path, or a URL associated with the path, and the WAP service load request from the MDS, or MDS simulator, to the wireless communication device, or the wireless communication device simulator; and a control panel programmed to transmit to the wireless communication device, or the wireless communication device simulator, a playback instruction for controlling playback of the media content running on the wireless communication device, or the wireless communication device simulator.

12. A communications network comprising a wireless communication device, a mobile data service and an apparatus for testing media content developed for a wireless communication device, the apparatus comprising:

a media content composer module for developing media content for the wireless communication device;

a web server;

a dispatcher module programmed to:

receive a media content simulation request from the composer module;

publish the media content developed on the composer module onto the web server, the media content published on a path in response to a received simulation request; and transmit to the mobile data service connection service the path and a wireless application protocol (WAP) service load request for the wireless communication device or a wireless communication device simulator to open a web browser and access the path thereby downloading and running the media content from the web server by sending the WAP service load request to a mobile data service (MDS), or to a MDS simulator, and pushing the path, or a URL associated with the path, and the WAP service load request from the MDS, or MDS simulator, to the wireless communication device, or the wireless communication device simulator; and a control panel programmed to transmit to the wireless communication device, or the wireless communication device simulator, a playback instruction for controlling playback of the media content running on the wireless communication device, or the wireless communication device simulator.

* * * * *